J. L. WALTERS.
PLOW HARROW.
APPLICATION FILED JAN. 10, 1913.
1,121,427.
Patented Dec. 15, 1914.
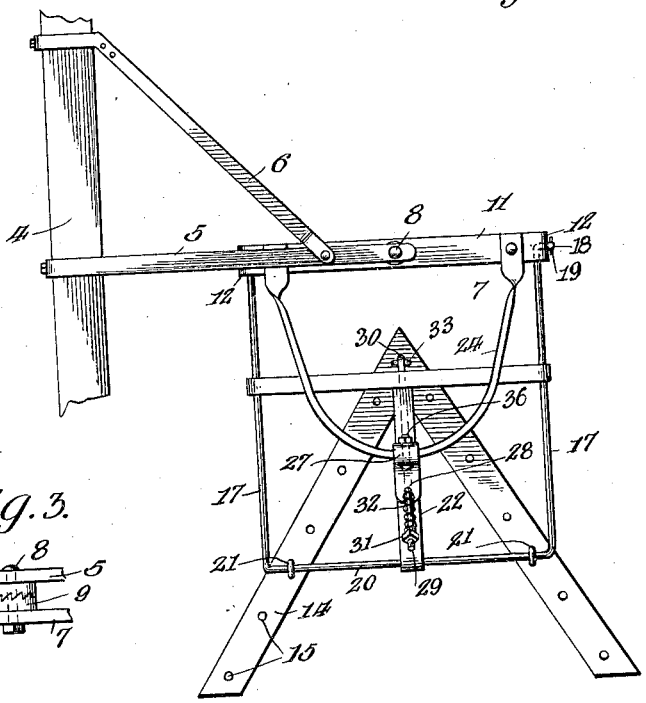
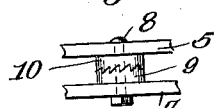
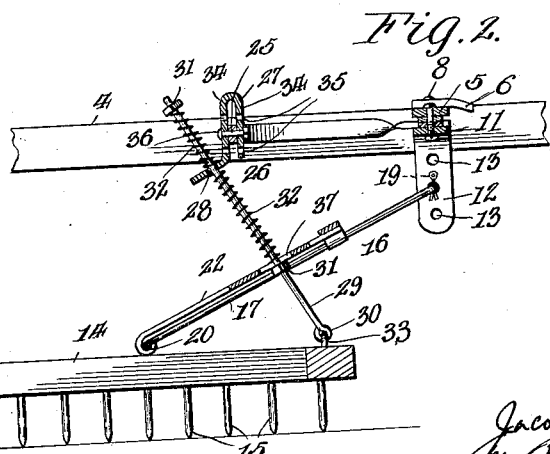

UNITED STATES PATENT OFFICE.

JACOB L. WALTERS, OF SIOUX VALLEY, MINNESOTA.

PLOW-HARROW.

1,121,427.  Specification of Letters Patent.  Patented Dec. 15, 1914.

Application filed January 10, 1913. Serial No. 741,340.

*To all whom it may concern:*

Be it known that I, JACOB L. WALTERS, a citizen of the United States, residing at Sioux Valley, in the county of Jackson and State of Minnesota, have invented new and useful Improvements in Plow-Harrows, of which the following is a specification.

My present invention relates to plow harrows particularly adapted for connection with the plow, to move with the same, to pulverize the ground as it is plowed.

The principal objects of my invention are to provide a harrow adapted for attachment to the beam or other frame member of an agricultural implement, whereby it may be set to operate at a predetermined adjusted position relative to said implement; to provide means for adjusting the pressure upon the harrow, to enable it to successfully perform its function; to adapt the draw frame of the harrow for supporting the frame of the soil-working elements according to the size of the latter; and in general, to provide a harrow which is simple in construction, and hence inexpensive to manufacture.

Another object of my invention is to provide a harrow which will not oscillate to any material extent relative to the implement to which it is attached.

Other objects of my invention will appear in the following detailed description, taken in connection with the accompanying drawing forming a part of this specification, and in which drawing:

Figure 1 is a plan view of the harrow embodying my invention, and showing its application to a member of an agricultural implement. Fig. 2 is a sectional view on the line 2—2 of Fig. 1. Fig. 3 is a fragmentary detailed view showing means for retaining the draw frame in a rigid adjusted position relative to the draw-bar of the harrow.

In the drawing where similar characters refer to similar parts, 4 designates a frame member of an agricultural implement, such as a gang plow. To this frame member is secured a draw-bar 5, and a brace 6 may be provided, operatively connecting the draw-bar 5 and frame member 4, to retain the same rigid with the latter. The draw-bar 5 carries a draw frame 7, preferably pivoted thereto as by a bolt 8. The frame 7 may be retained in a rigid adjusted position relative to bar 5, as by co-acting clamps 9 and 10, which clamps are carried by members 7 and 5, respectively. The draw frame 7 preferably includes a cross-bar 11, carrying downwardly extending arms 12, disposed in spaced apart relation to each other. Each arm 12 is provided with a plurality of transverse apertures 13 disposed longitudinally thereof, for a purpose to be subsequently set forth. I provide a frame 14, preferably symmetrically of frame 7, adapted to carry soil working or harrowing members 15. As disclosed in Fig. 1, this frame is preferably V-shaped, to be drawn with its apex foremost. The frame 14 is operatively connected with draw frame 7 as by drag means designated generally by 16. This drag means preferably comprises a U-shaped member, the arms 17 of which have trunnion-like projections 18 fitting into the apertures 13 in arms 12, and having securing means 19, such as cotter-pins passing through said projections 18. The cross-rod 20 of this means is pivotally connected to frame 14 as by eye-bolts 21 surrounding the same. The arms 17 may be held in rigid spaced apart relation to each other, as by a T-shaped brace 22, which rigidly braces the drag means. The draw frame 7 may include a rearwardly projecting yoke 24, having a transverse aperture 25, for a purpose to be subsequently set forth. This yoke carries pressure imposing means 26 for coöperation with frame 14. This means preferably comprises a bracket 27 adjacently carried by yoke 24, and apertured at 28; a rod extending through aperture 28 and having an eye 30 at its lower end; adjustable collars or abutment 31 at both sides of bracket 27; and, two coil springs 32 about rod 28, one spring a each side of the bracket 27, at which they abut, and one confined between the upper abutments 31 and the other against brace 22. The rod 29 is adapted to force frame 14 downwardly by being secured thereto, as by eye 30 receiving a hook 33 carried by the latter, and preferably in advance of the pivotal connection of drag means 16 with frame 14. By manipulating the abutments 31, the degree of pressure upon the frame 14 may be adjusted. The bracket 27 is adjustable vertically of frame 7 as by having two parallel portions 34 provided with a plurality of pairs of alined apertures 35, one pair of which may register with aperture 25 in yoke 24, to receive a bolt 36. By this arrangement, the frame 7, as well as the pressure imposing means 26 may be adapted for successful operation according to the size of frame 14. Rod 29 may pass through an aperture 37 in member 22 so as to be operatively connected with frame 14 in alinement with its axis of symmetry.

The operation of the harrow is as follows: The draw frame 7, together with the parts carried thereby, may be adjusted relative to draw-bar 5, or in other words, relative to the implement it is carried by, by loosening bolt 8 and moving the clamps 9 and 10, one relative to the other. As soon as the frame 14 is disposed as desired, relative to the implement it is drawn by, the bolt 8 is tightened making the clamps 9 and 10 effective as retaining means.

Practically any size or shape frame similar to that designated 14, may be applied to the draw frame 7, inasmuch as the drag means 16 is adjustable thereto, as hereinbefore described.

By bodily moving the abutments 31 longitudinally of rod 29, the degree of pressure imposed upon frame 14, may be adjusted, for successful operation according to the density of the soil upturned by the plow. The springs 32 further serve as resilient means to permit the frame 14 to follow closely the soil thus upturned, in order that the soil working members 15 may pulverize the soil cake.

Changes in details may be made without departing from the spirit or scope of my invention; but,

I claim:

1. A harrow comprising in combination, a draw frame adapted for connection with an agricultural implement to be rigid therewith, a frame having soil harrowing members, drag means operatively connecting said second mentioned frame with said draw frame, a bracket carried by said draw frame and having an aperture, a rod pivoted to said second mentioned frame and extending through the said aperture in said bracket, two coil springs about said rod, one at each side of said bracket with which they abut, and an adjustable abutment for the other end of the uppermost of said springs, carried by said rod, substantially as and for the purpose set forth.

2. A harrow comprising in combination, a draw frame adapted for connection with an agricultural implement to be rigid therewith, a frame having soil harrowing members, drag means operatively connecting said second mentioned frame with said draw frame, a bracket adjustably carried by said draw frame and having an aperture, a rod pivoted to said second mentioned frame extending through the said aperture in said bracket, two coil springs about said rod, one at each side of said bracket with which they abut, and an adjustable abutment for the other end of the uppermost of said springs, carried by said rod, substantially as and for the purpose set forth.

3. A harrow comprising in combination, a draw frame adapted for connection with an agricultural implement to be rigid therewith, a frame having soil harrowing members, drag means operatively connecting said second mentioned frame with said draw frame, a bracket carried by said draw frame and having an aperture, a rod pivoted to said second mentioned frame in advance of the connection of said drag means therewith, and extending through the said aperture in said bracket, two coil springs about said rod, one at each side of said bracket with which they abut, and an adjustable abutment for the other end of the uppermost of said springs, carried by said rod, substantially as and for the purpose set forth.

4. A harrow comprising in combination, a draw frame adapted for connection with agricultural implements, a frame having soil harrow members, drag means operatively connecting said second-mentioned frame with said draw frame, a rod pivoted to said second-mentioned frame in advance of the connection in said drag means therewith, means for slidably connecting said rod with said draw frame, coil springs about said rod, one attached to each side of said connecting means with which they abut, and an adjustable abutment for the other end of the uppermost of said springs carried by said rod.

JACOB L. WALTERS.

Witnesses:
H. A. HAMANN,
FRED WOLTER.